United States Patent [19]

Dais

[11] Patent Number: 5,164,420
[45] Date of Patent: Nov. 17, 1992

[54] PHOTODEGRADABLE POLYMERS OF FURAN DERIVATIVES

[75] Inventor: Virginia A. Dais, Midland, Mich.

[73] Assignee: The Dow Chemical Company, Midland, Mich.

[21] Appl. No.: 603,584

[22] Filed: Oct. 26, 1990

[51] Int. Cl.$^5$ ............................................. C08F 234/02
[52] U.S. Cl. .................................... 521/149; 526/270
[58] Field of Search ......................... 521/149; 526/270

[56] References Cited

U.S. PATENT DOCUMENTS 3,962,195 6/1976 Moczygemba et al. ............ 526/266
4,962,158 10/1990 Kobayashi et al. ................. 526/270

Primary Examiner—Joseph L. Schofer
Assistant Examiner—A. H. Walker

[57] ABSTRACT

Photodegradable polymers comprising substituted furan functionality or ring opened derivatives thereof and thermoplastic articles formed therefrom.

6 Claims, No Drawings

PHOTODEGRADABLE POLYMERS OF FURAN DERIVATIVES

BACKGROUND OF THE INVENTION

This invention relates to novel plastic compositions having enhanced environmental degradability. More particularly the present invention relates to thermoplastic resins having enhanced rates of photodegradation.

The advent of thermoplastics has given rise to improved articles and packaging. For example, molded, foamed, and thermoformed articles, such as solid objects, films, bottles, bags, cartons, and other containers have the advantages of being chemically resistant, relatively unbreakable, and light in weight. However, the increasing use of thermoplastics in packaging and other applications has created a serious waste disposal problem. Many plastic objects litter the countryside after being discarded by careless users.

One approach to the alleviation of the problem of plastic waste and litter is the development of novel polymeric compositions which undergo accelerated degradation under environmental conditions. This general approach has been described in the prior art.

Photosensitizing ketone groups have been introduced into the structure of polymer molecules by the copolymerization of ethylenically unsaturated monomers with vinyl ketones. For example, reference is made to U.S. Pat. Nos. 3,753,952, 3,860,538 and 4,176,145 which describe the preparation of photodegradable polymeric materials by the copolymerization of vinyl- or isopropenyl ketones with copolymerizable comonomers.

Polymers having ketone groups at positions adjacent to the chain, such as those derived from vinyl ketone comonomers, can undergo photochemical degradation by direct photolytic chain scission. This mechanism leads to a rapid decrease in molecular weight upon exposure to ultraviolet radiation. As a result, articles formed from the polymer become friable and soon are crushed to small particulates which are incorporated with the soil.

However, often the rate of degradation by exposing such polymers to light is not sufficiently high to result in appreciable destruction of objects made from such polymers. It would be desirable to provide polymers having increased susceptibility to photodegradation.

It would be desirable to provide a thermoplastic resin suitable for use in the manufacture of containers, packaging, films and foams that is highly susceptible to ultraviolet light degradation. Such a polymer would allow greater efficiency in use. That is, polymers containing reduced amounts of the applicable degradation inducing component could be prepared. In addition blends utilizing reduced amounts of such polymer could also be prepared.

In U.S. Pat. No. 3,962,195 terpolymers of a furan, maleic anhydride and a conjugated diene or vinyl aromatic compound are disclosed.

According to the present invention there are provided polymeric compositions comprising repeating units corresponding to the formulas:

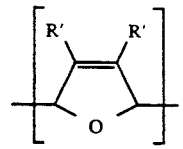

wherein R is hydrogen or $C_{1-6}$ alkyl; R' independently each occurrence is R or an electron withdrawing group corresponding to the formula $C(O)R''$, wherein $R''$ is OR, $NR_2$, or Cl, and provided that in at least one occurrence R' is an electron withdrawing group; and Z is phenyl, halo, nitrile or C(O)OR. The ring opened polymers possess enhanced photodegradability due to the direct incorporation of the ketone functionality into the polymer chain, and in addition, due to the presence of residual unsaturation which provides an additional site for photodegradation to occur.

The polymers are suitably prepared by copolymerizing 1) one or more vinyl monomers selected from the group consisting of styrene, vinyl chloride, acrylontrile, acrylic acid, methacrylic acid and $C_{1-6}$ alkyl esters of acrylic acid or methacrylic acid, with 2) one or more substituted furan derivatives corresponding to the formula:

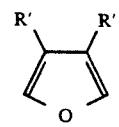

wherein R' is as previously defined. Because of the presence of at least one electron withdrawing R' group, the substituted furan compound may be polymerized with ethylenically unsaturated comonomers under vinyl polymerization conditions. In the absence of an electron withdrawing group, no polymerization occurs. The ring opened polymeric products are formed upon acid catalyzed hydrolysis using known reaction conditions.

A most preferred substituted furan monomer is dimethyl-3,4-furandicarboxylate. A preferred vinyl monomer is styrene.

The initially formed polymers may be prepared by polymerization of the respective monomers under free radical, solution or bulk polymerization conditions. Preferably the respective monomers are combined in the presence of a free radical initiator at temperatures from 25° to 200° C., more preferably 50° to 150° C. Suitable free radical initiators include peroxide or azo containing compounds. A solvent such as toluene, tetrahydrofuran, or similar non-reactive liquid may also be present.

Preferably the quantity of monomers is adjusted so as to provide from 0.1 to 30.0 mole percent, more preferably 0.2 to 10.0 mole percent, most preferably from 0.3 to 1.0 mole percent of the substituted furan monomer component in the polymer.

The polymers preferably have an initial molecular weight (Mw) from 50,000 to 2,000,000, more preferably from 100,000 to 1,000,000. Molecular weights are determined according to gel permeation chromatography using a polystyrene standard.

The polymers are readily thermoformed, molded or extruded into films according to known fabrication techniques. Secondary operations such as foaming, orientation, printing, etc. are also easily performed utilizing previously known techniques. Advantageously the polymers according to the present invention readily decompose into particulates upon exposure to ultraviolet radiation.

Having described the invention the following examples are provided as further illustrative and are not to be construed as limiting.

EXAMPLES 1-2

Sealed, glass ampoules containing styrene and 10 (Example 1) or 20 (Example 2) weight percent dimethyl-3,4-furandicarboxylate were heated in a 150° C. oil bath for one hour. The resulting polymers were precipitated three times from a toluene/methanol mixture. Infrared spectroscopy confirmed the presence of furan functionality in the polymers. The ring opening reaction was conducted in dioxane under reflux conditions for 48 hours in the presence of concentrated HCl catalyst. Ring opening was confirmed by infrared spectroscopic analysis. The content of functional monomer in Example 1 was approximately 0.5 mole percent and in Example 2, it was approximately 1.0 percent.

Films were cast from solution and exposed to ultraviolet light in an artificial weathering chamber. Molecular weight before and after exposure for 6 and 24 hours were determined by gel permeation chromatography based on a polystyrene standard. Decrease in molecular weight was taken as an indicator of effective chain scission by light. Results are contained in Table I.

TABLE I

| Sample | Percent Mw decrease after 6 hr. | Percent Mw decrease after 24 hr. |
| --- | --- | --- |
| Example 1 | 16[a] | 24 |
| Example 2 | 21[b] | 33 |
| Comparative* | 0[c] | 0 |

*polystyrene standard
[a] initial Mw = 181,700
[b] initial Mw = 155,200
[c] initial Mw = 211,900

What is claimed is:

1. A foamed article comprising a thermoplastic polymer comprising repeat units corresponding to the formula:

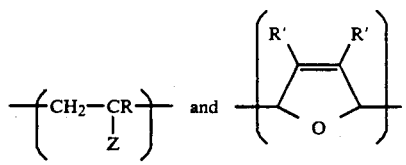

wherein R is hydrogen of $C_{1-6}$ alkyl; R' independently each occurrence is R or an electron withdrawing group corresponding to the formula C(O)R'', wherein R'' is OR, $NR_2$, or Cl, and provided that in at least one occurrence R' is one of said electron withdrawing groups; and Z is phenyl, halo, or C(O)OR.

2. Thermoplastic polymers consisting essentially of repeat units corresponding to the formulas:

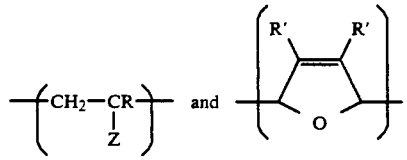

wherein R is hydrogen or $C_{1-6}$ alkyl; R' independently each occurrence is R or an electron withdrawing group corresponding to the formula C(O)R'', wherein R'' is OR, $NR_2$, or Cl, and provided that in at least one occurrence R' is one of said electron withdrawing groups; and Z is phenyl, halo, or C(O)OR.

3. A thermoplastic polymer according to claim 2 wherein Z is phenyl.

4. A thermoplastic polymer according to claim 2 which is a copolymer of styrene and dimethyl-3,4-furandicarboxylate.

5. A thermoplastic polymer according to claim 4 comprising from 0.1 to 30.0 mole percent dimethyl-3,4-furandicarboxylate.

6. A thermoplastic article having enhanced photodegradation properties comprising a polymer according to claim 2.

* * * * *